United States Patent
Teh et al.

(10) Patent No.: US 6,339,757 B1
(45) Date of Patent: Jan. 15, 2002

(54) BIT ALLOCATION METHOD FOR DIGITAL AUDIO SIGNALS

(75) Inventors: Do Hui Teh; Pek Yew Tan; Sua Hong Neo, all of Singapore (SG)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 08/161,798

(22) Filed: Dec. 6, 1993

(30) Foreign Application Priority Data

Feb. 19, 1993 (JP) .............................................. 5-030712

(51) Int. Cl.$^7$ .............................................. G10L 19/04
(52) U.S. Cl. ........................ 704/219; 704/229; 704/220
(58) Field of Search ............................. 395/2.38, 2.39; 381/29, 30

(56) References Cited

U.S. PATENT DOCUMENTS

| | | | |
|---|---|---|---|
| 5,105,463 A | * 4/1992 | Veldhuis et al. | 381/30 |
| 5,151,941 A | * 9/1992 | Nishiguchi et al. | 381/46 |
| 5,260,980 A | * 11/1993 | Akagiri et al. | 375/122 |
| 5,479,562 A | * 12/1995 | Fielder et al. | 395/2.38 |

FOREIGN PATENT DOCUMENTS

| | | |
|---|---|---|
| EP | 0457391 | 11/1991 |
| WO | WO89/07866 | 8/1989 |
| WO | WO92/17884 | 10/1992 |

OTHER PUBLICATIONS

Veldhuis et al, "Subband Coding of Digital Audio Signals Without Loss Quality," ICASSP–89, 1989, pp. 2009–2012.*
*IEEE Global Telecommunications Conference*, vol. 1, Dec. 2, 1990, New York, pp. 518–522, Mahieux, et al. "Transform Coding of Audio Signals at 64KBIT/S$^1$," p. 520, ¶IV "The Bit Allocation."
*Philips Journal of Research*, vol. 44, No. 2/3, Jul. 1989, Eindhoven NL, pp. 329–343, Veldhuis, et al. "Subband Coding of Digital Audio Signals," pp. 338, 1.3—p. 340, 1.33.

* cited by examiner

Primary Examiner—Fan Tsang
Assistant Examiner—Michael N. Opsasnick
(74) Attorney, Agent, or Firm—Smith, Gambrell & Russell, LLP

(57) ABSTRACT

When determining a quantization for digital audio signals having a spectral and temporal structure wherein the audio signals are buffered in frames and decomposed into spectral components, the method is: obtaining a variance and/or a representative of the components of the the frame within a defined frequency interval; computing a necessary bandwidth using psychoacoustic criteria; determining an initial quantization for each frequency interval using an approximate mathematical model; and iteratively increasing the quantization of each of the frequency intervals through a psychoacoustically weighted inverse relationship with the the variance of each of the frequency intervals.

21 Claims, 8 Drawing Sheets

| unit number | spectral line number | bit allocation data |
|---|---|---|
| unit 0 | 8 | WL(0) |
| unit 1 | 4 | WL(1) |
| unit 2 | 4 | WL(2) |
| unit 3 | 4 | WL(3) |
|  |  |  |
| unit 24 | 10 | WL(24) |
| unit 25 | 10 | WL(25) |

Fig. 8

BIT ALLOCATION METHOD FOR DIGITAL AUDIO SIGNALS

BACKGROUND OF THE INVENTION

1. Field of The Invention

This invention relates to the efficient information coding of digital audio signals for transmission or digital storage media especially a quantization method using an efficient bit allocation method for information coding

2. Related art of The Invention

Compression algorithms for wide band audio signals are finding wide-spread applications in recent years. In the area of consumer electronics, the digital compact cassette (DCC) and the mini-disc system (MD) are two applications of these compression algorithms.

While the DCC system uses a compression algorithm that is based on sub-band coding, the MD system uses an algorithm that is based on a hybrid of sub-band and transform coding with the transform coding portion forming the backbone of the algorithm. This invention is related to the dynamic bit allocation of the MD coder.

The MD system uses the ATRAC compression algorithm that is documented in chapter 10 of the MD system description by Sony in December 1991. The ATRAC algorithm compresses the input audio signals at a bit rate of 705.6 k bit/s/channel to a bit rate of 146.08 k bit/s/channel.

Figure 8:
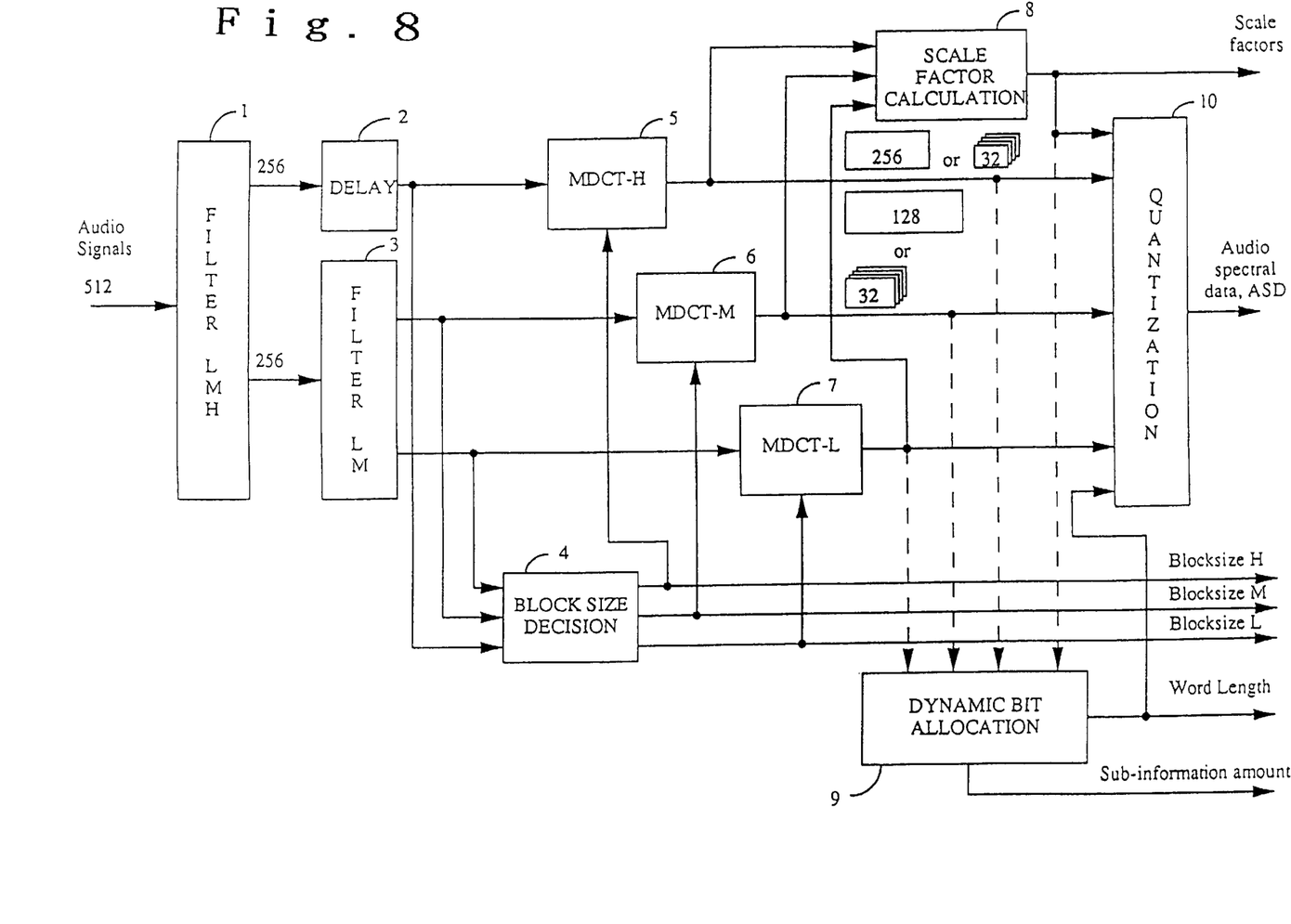
FIG. 8 is the block diagram of the encoding process of the prior art.

FIG. 8 shows the block diagram of the encoding process. The input time signals are first passed through a splitting filter bank, 1, 2, 3, to obtain the signals in three frequency bands. The lower two bands are each at half the bandwidth of the uppermost band. Block size decision, 4, is made for each band to determine the sample size or block mode for the windowing and transform process, 5, 6, 7. One of the two block modes available—short block mode or long block mode, will be selected for each of the bands. The transformed spectral samples are grouped into units and in each unit, a scale factor is derived from the peak values of the samples in the unit, 8. These units are non-uniform frequency intervals with a finer resolution in the low frequencies and coarser resolution in the higher frequencies. Quantization, 10, is carried out on the samples using the scale factor and bit allocation information from the dynamic bit allocation module, 9.

The dynamic bit allocation method forms an integral part in any adaptive compression algorithm. The quality of the reconstructed output and the extent of redundancy and irrelevancy removal are largely determined by the bit allocation method. In addition, the bit allocation procedure also plays a part in determining the degree of hardware complexity. As the bit allocation in the ATRAC algorithm is mainly applied to the transformed spectral samples, numerous example of prier art exist for this type of transform coder. These dynamic bit allocation techniques can be grouped largely into two categories.

The first category consists of bit allocation methods applying the psychoacoustic phenomena of simultaneous masking and threshold in quiet to derive the masking threshold. Examples in this category include the bit allocation in the MD system description, where the MDCT spectral samples are used to compute the masking threshold. A more complicated technique is described in the paper entitled 'Transform Coding of Audio Signals using perceptual noise criteria' by J. D. Johnston, where a Fast Fourier Transform (FFT) is used to obtain the frequency spectral components for more complex masking calculations.

The second category offers a more simplified method of allocating according to the signal statistics. An example is the optimum bit allocation procedure described in 'Digital Coding of Waveforms' by N. S. Jayant and P. No 11, which allocates the bits to the different spectral components by minimizing the reconstructed error against a constant bit rate.

Meanwhile the object of the dynamic bit allocation procedure is to remove redundancy and irrelevancy while maintaining the original audio quality. To enable the applications of this algorithm in consumer products, which in general are low in cost, the algorithm has to have low complexity. The greatest difficulty in the design of a dynamic bit allocation procedure lies in balancing good audio quality while at the same time, keeping the procedure as simple as possible. The bit allocation procedures described under category one in the previous section are able to produce good sound quality. However, a great deal of complexity is incurred. Most of these algorithms require full DSP (either fixed point or floating point in some cases) power in order to perform the bit allocation.

On the other hand, the optimum bit allocation procedure mentioned above, while less complex, is unable to attain the quality of the perceptual based bit allocation as its design is concentrated purely on the source which is the audio signal and not on the final receiver, the human auditory system.

Further, allocation procedure requires a large number of iterative loops in order to use up the channel bit rate optimally. This problem was highlighted by the authors in the 'Digital Coding of Waveforms'. Therefore this bit allocation algorithm is unsuitable in the case where there is a great constraint on the execution time of the DSP. To compound the problem of intensive iteration is the fact that in the MD coding algorithm, a non-uniform number of spectral samples are grouped in each unit, therefore making it difficult to compute the number of bits that will be used up without a bit by bit allocation.

SUMMARY OF THE INVENTION

The object of this invention is to design a dynamic bit allocation procedure that is adapted to the human auditory system and yet with a low level of complexity so that high audio quality can be achieved while at the same time meeting the low cost target.

For the purpose of achieving the above object, the dynamic bit allocation comprises the means of obtaining the variance or a representative within a defined frequency interval as an accurate representation of the signals in the interval; the means of determining the necessary bandwidth of the audio signal using the human hearing threshold so that irrelevancy is removed; the means of determining the initial quantizations using an approximate mathematical model which considers the in-band masking effect of the signal; the means of increasing the quantizations iteratively so as to meet the final bit rate required while maintaining the affect of the mathematical model.

The bit allocation method has a very important role for determining the quality of the reconstructed output and the complexity of hardware. The present invention realizes a dynamic bit allocation method which produces low hardware complexity and high quality audio, by combining psychoacoustic criteria and human hearing threshold. The low complexity hardware is realized by allocating an initial bit number using the approximations made in the mathematical model before the remaining bit number is allocated by a precise iterative process.

That is in the present invention, the variance or representative used in the bit allocation procedure considers the dynamic behavior of the signals and adjusts to it while the bandwidth computation considers the human auditory system and adapts the bit allocation to it. The mathematical model also adapts to the human auditory system by considering masking while at the same time serving to reduce the number of computational steps or loops required for the bit allocation. This means further simplifying the procedure by approximating the dynamic elements within the relation with the statistically derived constants. The iterative means ensure that the desired bit rate is met while adjusting for the approximations made in the mathematical model.

Figure 5:
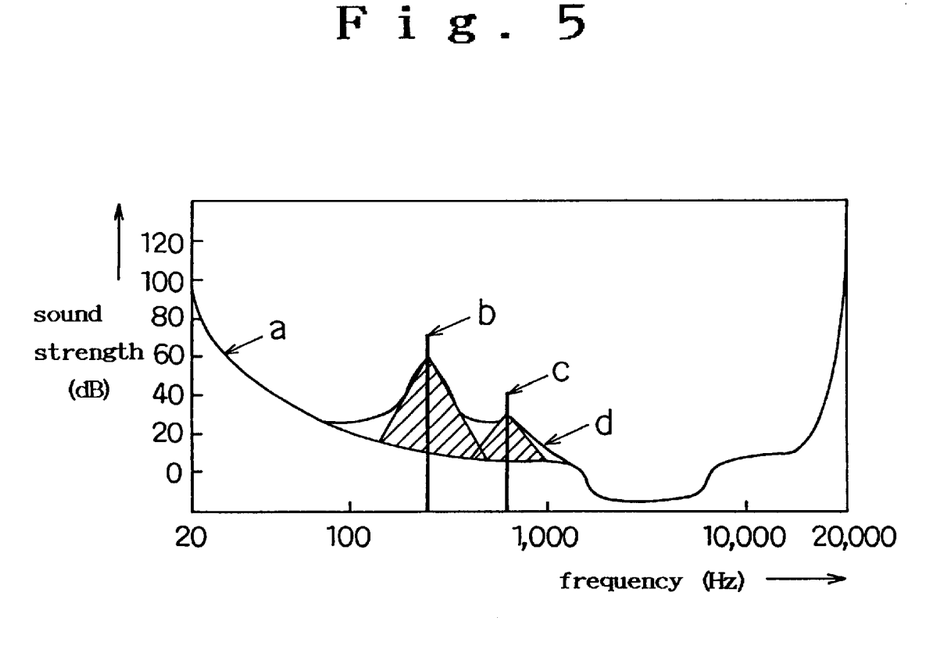
FIG. 5 is the graph showing the relation of the frequency and sound strength (dB).

Meanwhile the meaning of masking threshold is described as follows. FIG. 5 shows an example of the masking threshold. In the figure 'a' indicates the least audible value and the area above the line is the human audible area. And 'b' and 'c' shows spectrum of strong signal component and the hatched parts are the such portion masked by signals 'b' and 'c'. The curve 'd' is a threshold value of masking obtained from the audible area and the hatched parts masked by 'b', 'c' signals. Since the signal below the threshold value 'd' can not be sensed, the quantization is not necessary. Since the masking threshold is high at signal 'b', a higher quantization noise near this frequency will still remain inaudible.

PREFERRED EMBODIMENTS

Figure 1:
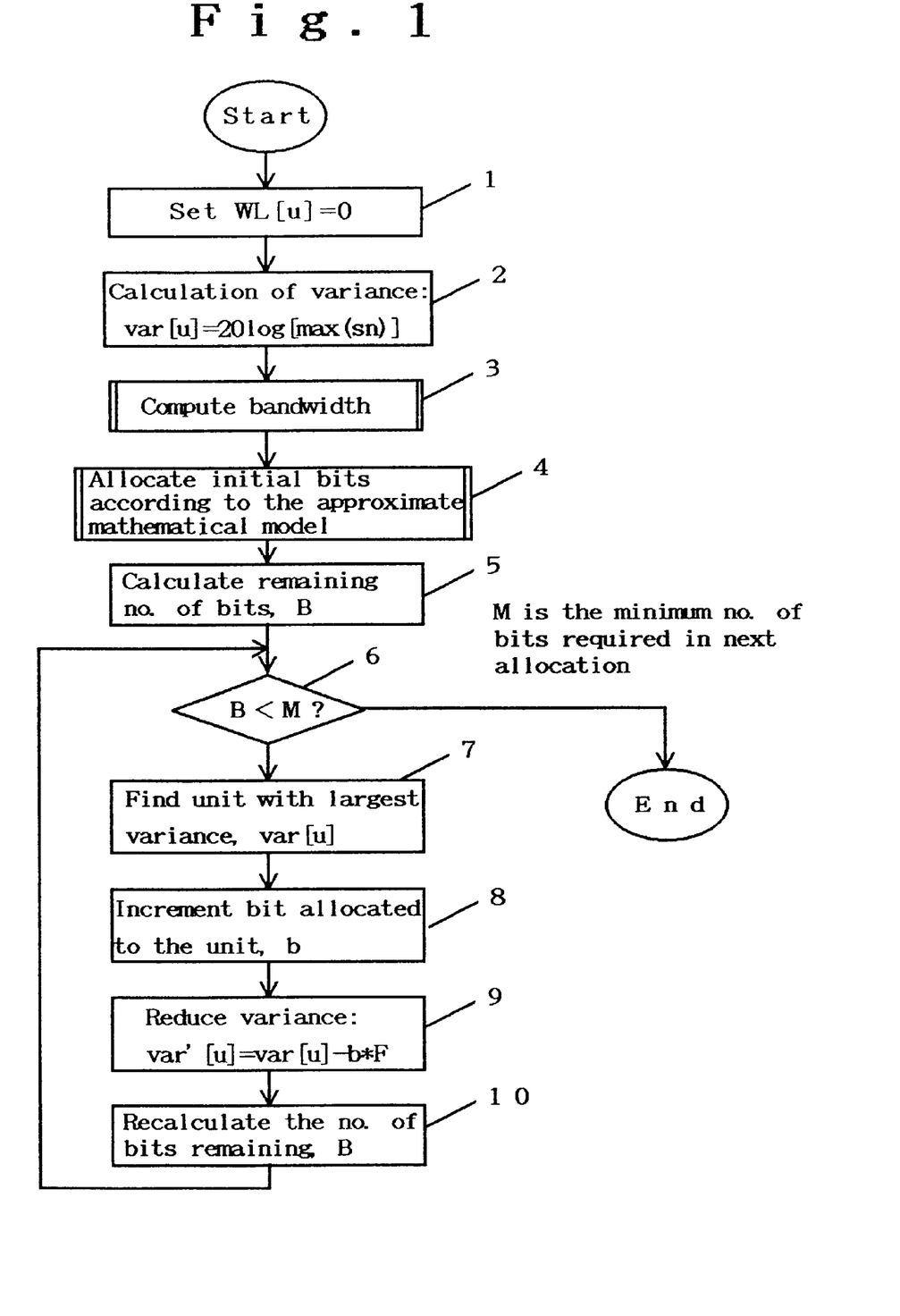
FIG. 1 is the flowchart of the present embodiment of the invention.

FIG. 1 shows an embodiment of the present invention. First, the quantizations or bit allocations for each frequency interval or unit (WL[u]) is set to zero (step numeral 1). The details of the unit are described in the next paragraph. The variance in each unit is calculated from the maximum spectral sample amplitude in the unit (step of numeral 2). Other embodiments the invention can have variations in step numeral 2 where the variance can be calculated from an average of the spectral components within the unit. The maximum spectral sample amplitude was found to be a good worst case representative of the signals in the unit, be it tone-like or noise-like. Further, using the maximum spectral sample saves some computational steps. The bandwidth of transmission is computed next (step numeral 3). In step numeral 4, the initial number of bits are allocated according to the approximate mathematical model. Calculation of the remaining bits is then done in step numeral 5. The remaining bits, B are iteratively allocated to the units according to the following steps until the number of bits remaining is less than the minimum number of bits required in the next allocation.

[1] If the remaining bits, B is less than the minimum number of bits required in the next allocation, then the iteration is stopped (step numeral 6).

[2] Find the unit with the largest variance, var (step numeral 7).

[3] Increment the bit allocations in the unit by one or two bits (b),

WL'[u]=WL[u]+b (step numeral 8).

[4] Reduce the variance of the unit by var'[u]=var[u]−b*F, where F is the psychoacoustic weighting factor(step numeral 9).

[5] Recalculate the number of bits remaining, B'=B−b*A[u], where A[u] is the number of spectral lines in the unit, (step numeral 10).

[6] Steps [6] to [10]are repeated.

The unit, spectrum number and bit allocation data (WL) are described as follows.

Figure 6:
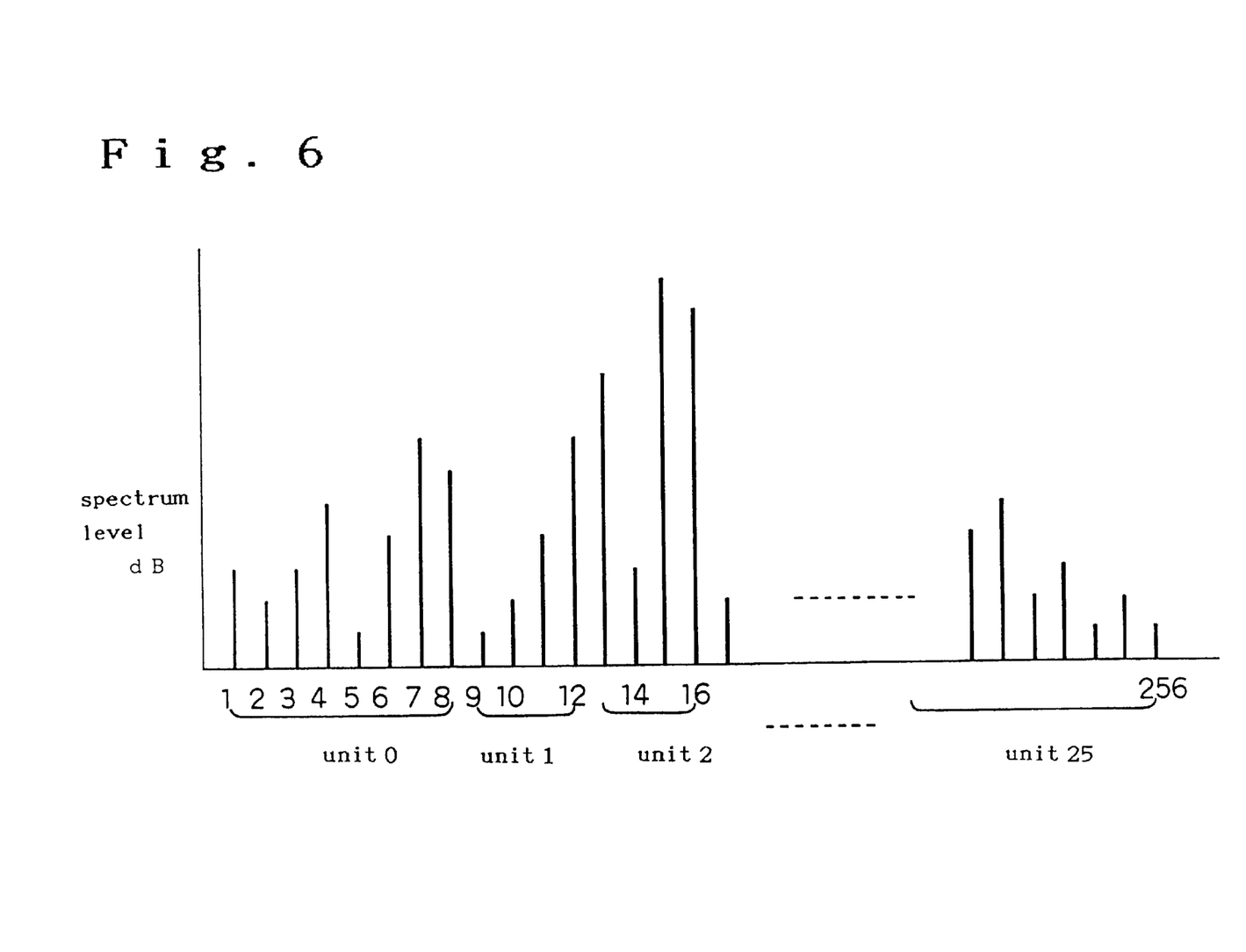
FIG. 6 is the illustration of a of spectrum grouped into 26 units.
Figure 7:
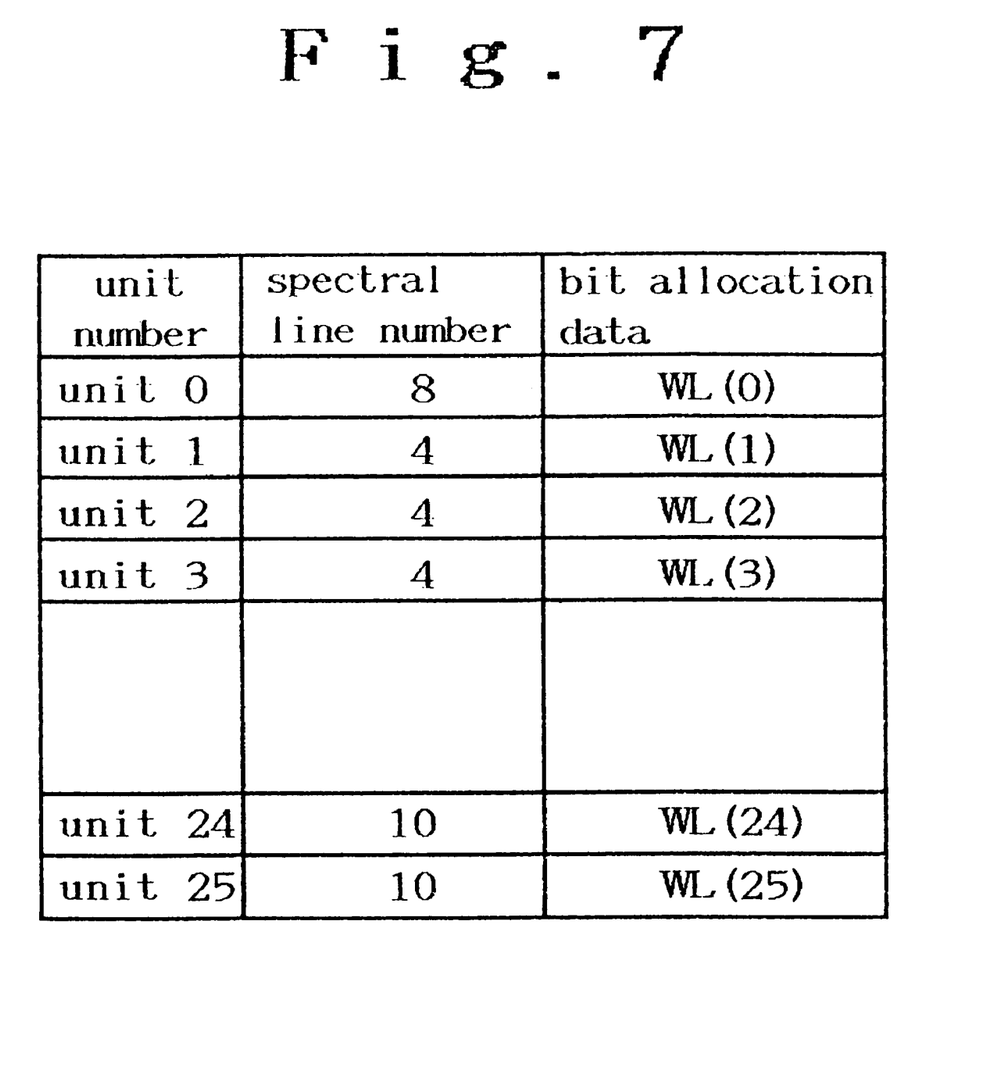
FIG. 7 is the table of the bit allocation data WL.

The audio signal is transformed into, for example, 256 spectral lines by the MDCT. The spectral lines are grouped into plural units. In FIG. 6, the 256 spectral lines are grouped into 26 number units from 0–25. The bit allocation data WL(u) is given by an unit as shown in FIG. 7. In the example of FIGS. 6, 7, the spectral line numbers 1–8 have the same bit allocation data WL(0) and the spectral line numbers 9–12 have same bit allocation data WL(1).

Figure 2:
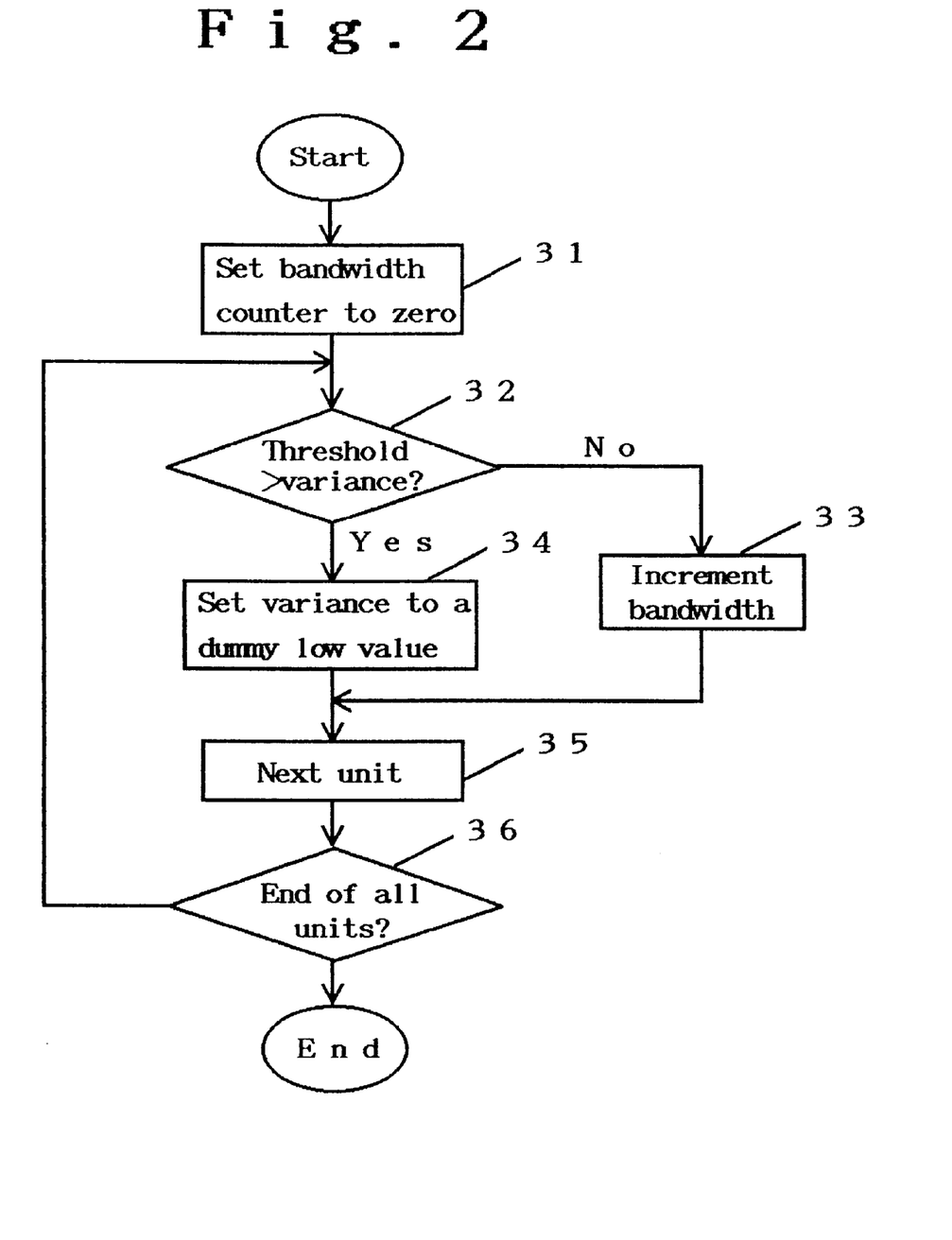
FIG. 2 is the flowchart of the compute bandwidth module within the present embodiment.

FIG. 2 shows the flow chart of the bandwidth computation procedure, a modified set of values of the human hearing threshold, obtained from listening tests, is used to determine the bandwidth of the audio signal and to almost eliminate any units where the variance is below the threshold from the next stage of bit allocation. First, the bandwidth counter is set to zero (step numeral 31). In step numeral 32, the block mode is tested. If the short block mode was used in the MDCT process, the thresholds for units having the same frequency resolution is obtained by selecting the lowest threshold from all these units (step numeral 33). Each unit's variance is then compared against the threshold (step numeral 34). If the variance is above the threshold, the bandwidth counter is incremented (step numeral 35). Otherwise, the variance in the unit is set to a low dummy value so that it will have the least chance of being allocated any bits in the next stage (step numeral 36). This procedure is repeated for all units (step of numeral 37 and 38). The use the hearing threshold will eliminate units that are irrelevant according to psychoacoustic criteria.

Figure 3:
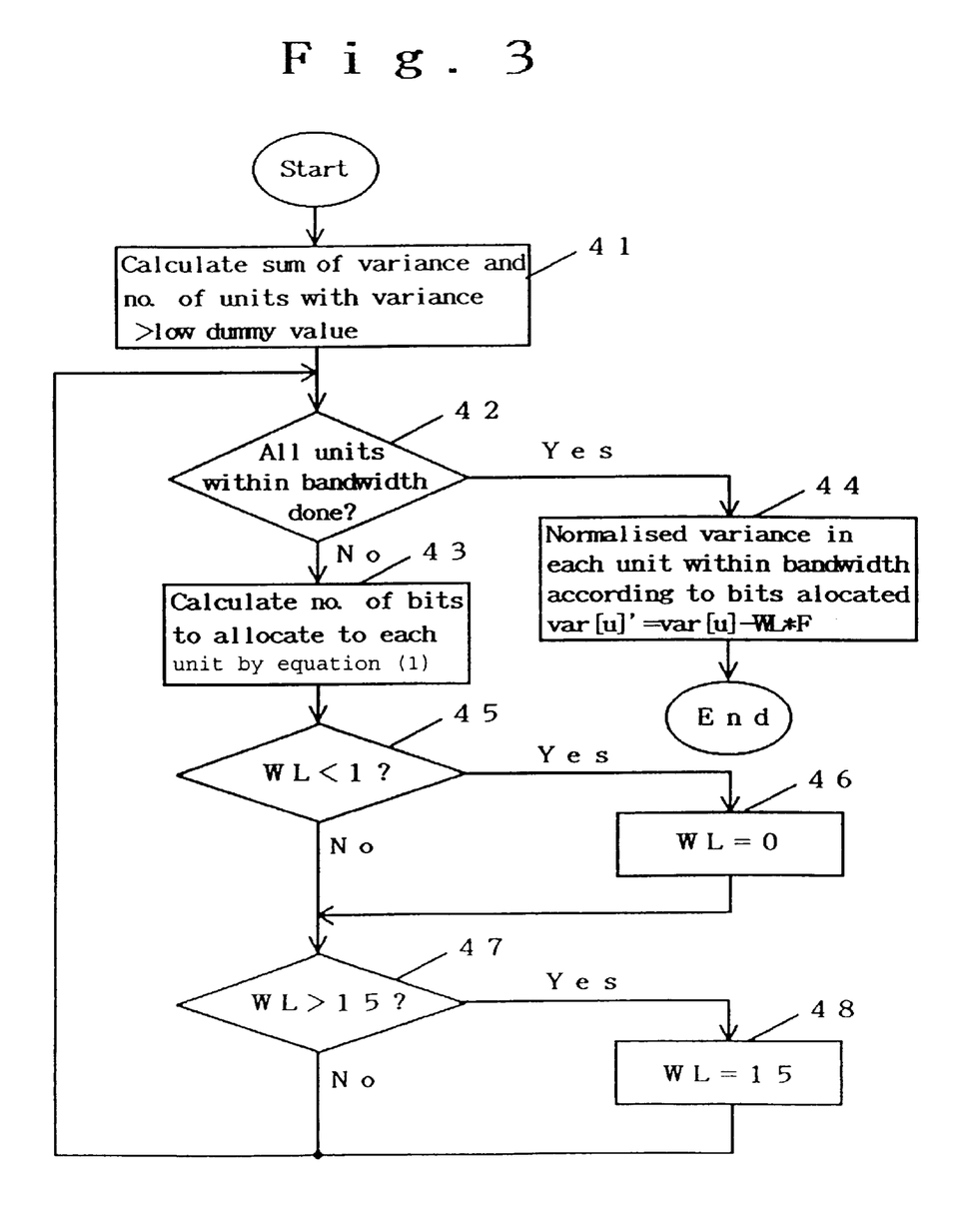
FIG. 3 is the flowchart of the initial bit allocation module within the present embodiment.

FIG. 3 shows the procedure of allocating the initial bits to each unit before the iterative process by an approximate mathematical model. First, the sum of all the variances and the number of units with variances greater than the low dummy value are calculated (step numeral 41). Step numeral 42 checks if all the units within the bandwidth have been processed. If all units are processed, then the variance in each unit is normalized according to the number of bits allocated to the unit (var'[u]=var[u]−WL*F) (step numeral 44). The procedure is then ended. If all of the units are not processed, then the number of bits to be allocated to the next unit, WL[u] is calculated by equation (1) shown below (step numeral 43):

$$WL[u] = \frac{\text{var}[u]}{F} - \frac{1}{NF}\sum_{u=0}^{N}\text{var}[u] + \frac{Ba}{AN} \qquad \text{equation (1)}$$

WL[u]: number of bits allocated to unit u
var[u]: variance of unit u
F: psychoacoustic weighting factor (a constant)
N: Number of valid units
Ba: Number of bits set aside for initial allocation
A: Approximate average number of spectral samples in a unit Steps numerals 45, 46, 47 and 48 check if the bit allocations are below the lowest limit or exceed the highest limit. In either the case, the lowest limit (0 bits) and the highest limit (15 bits) one is set respectively.

The mathematical model has the companding effect of allocating bits such that the error spectrum produced will follow the signal spectrum more closely. This is achieved by setting the value of F to be between 8.5 and 10. When F=6, a flat error spectrum is obtained and this was found to produce high frequency artifacts for a number of test sequences at the bit rate of operation.

Figure 4:
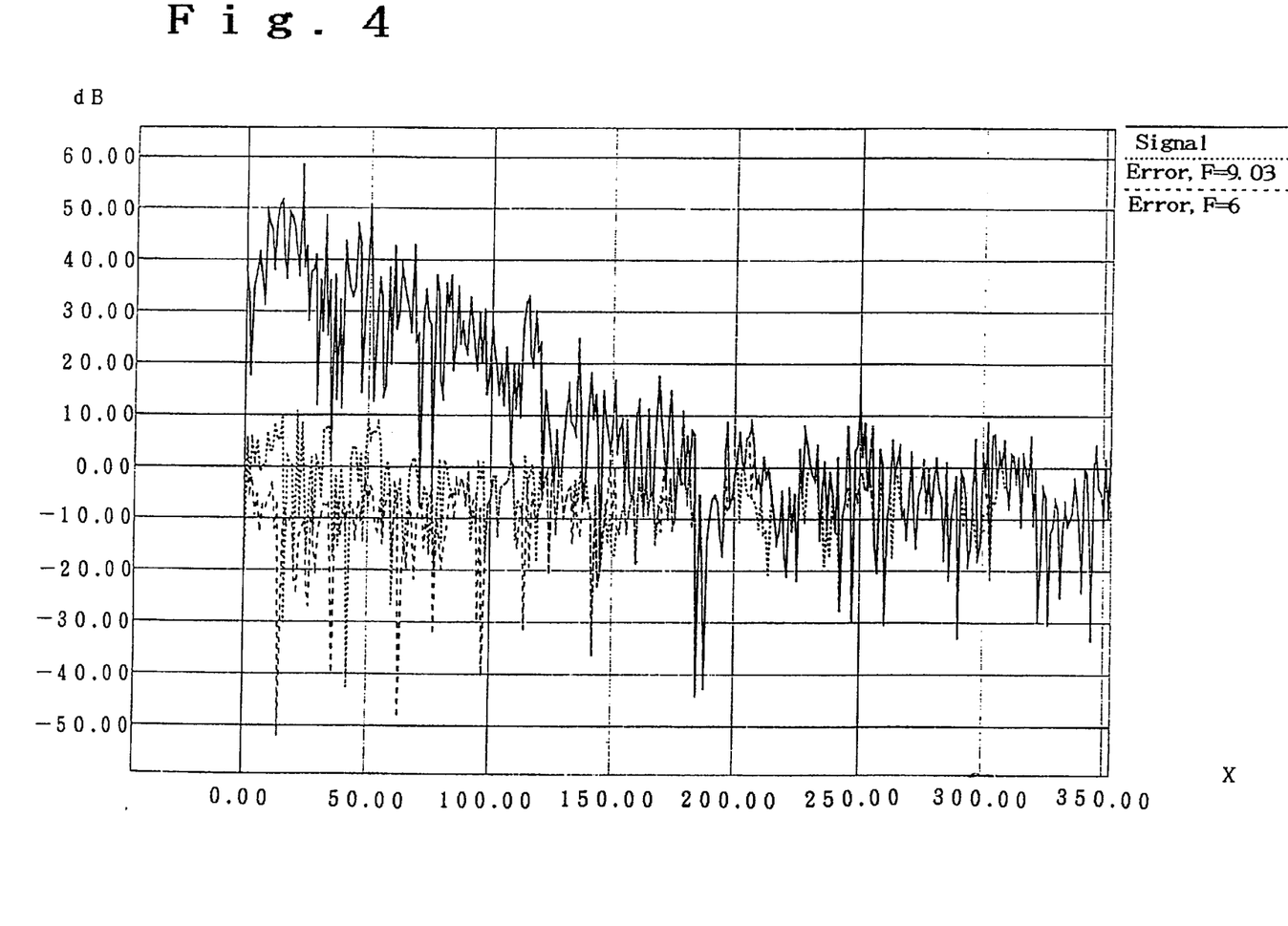
FIG. 4 is the spectral plot of a frame of violin signals and the error spectrums obtained with different values of F.

FIG. 4 illustrates the spectral plot of a frame of violin signals, the error spectrum when F=9.03 and the error spectrum when F=6. As can be observed from the plot, the F=9.03 error spectrum shows a higher value of error in the low frequencies but these errors are not noticeable as they are masked by a much stronger signal in the band. However, in the higher frequency end, the error spectrum of F=9.03 is lower and this accounts for the improvement in the noise control at high frequency. This form of allocation considers that strong signals can have greater in-band masking than weak signals and it is more advantageous to vary the error spectrum more closely to the signal spectrum. The mathematical model is able to allocate up to at least 65% of the total number of bits, thus reducing the number of iterations required.

This invention has been simulated to produce very high audio quality when used in the ATRAC algorithm. The bit allocation technique, being computationally less intensive takes up a total of 5.7 Mips. This can contribute significantly to a low cost and low power (due to the low frequency of operation) single chip LSI implementation of the encoder.

What is claimed is:

1. A method of determining a bit allocation for a quantization of digital audio signals having spectral and temporal structure wherein the digital audio signals are obtained by buffering audio signals in frames and decomposing the digital signals into spectral components, which comprises the steps of:
   a step for dividing at least one frequency interval into a plurality of frequency-units;
   a step for obtaining a representative of each frequency-unit obtained;
   a step for counting a number of available frequency-units by using the representative, based on psychoacoustic criteria;
   a first bit allocation step for determining an initial bit allocation for each of said available frequency-units by using an approximate mathematical model using said counted number of available frequency-units; and
   a second bit allocation step for determining further bit allocation for each of said available frequency-units based on psychoacoustic criteria.

2. Method according to claim 1, wherein said mathematical model is derived from an in-band masking effect such that an error spectrum will follow more closely to the original signal spectrum.

3. Method according to claim 2, wherein each frequency-unit is represented by a single spectral component.

4. Method according to claim 2, wherein said representative is a variance which is calculated from an amplitude of a maximum spectral component of each frequency-unit.

5. Method according to claim 2, wherein said representative is a variance which is calculated from an average of a spectral component of each frequency-unit.

6. A method according to claim 1, wherein said second bit allocation step is to determine the bit allocation through a psychoacoustically weighted inverse relationship with the said representative of each of said frequency-units.

7. Method according to claim 6, wherein each frequency-unit is represented by a single spectral component.

8. Method according to claim 6, wherein said representative is a variance which is calculated from an amplitude of a maximum spectral component of each frequency-unit.

9. Method according to claim 6, wherein said representative is a variance which is calculated from an average of a spectral component of each frequency-unit.

10. A method according to claim 1, wherein said counted number of available frequency-units is a number of the frequency-units which have the representative exceeding a human hearing threshold.

11. Method according to claim 10, wherein each frequency-unit is represented by a single spectral component.

12. Method according to claim 10, wherein said representative is a variance which is calculated from an amplitude of a maximum spectral component of each frequency-unit.

13. Method according to claim 10, wherein said representative is a variance which is calculated from an average of a spectral component of each frequency-unit.

14. Method according to claim 1, wherein each frequency-unit is represented by a single spectral component.

15. Method according to claim 1, wherein said representative is a variance which is calculated from an amplitude of a maximum spectral component of each frequency-unit.

16. Method according to claim 1, wherein each frequency-unit is obtained by dividing said spectral and temporal structure with at least one frequency interval.

17. Method according to claim 1, wherein said representative is a variance which is calculated from an average of a spectral component of each frequency-unit.

18. A method of determining a bit allocation for a quantization of digital audio signals having spectral and temporal structure wherein the digital audio signals are obtained by buffering audio signals in frames and decomposing the digital signals into spectral components, which comprises the steps of:
   a step for dividing at least one frequency interval into a plurality of frequency-units;
   a step for obtaining a representative of each frequency-unit obtained;
   a step for counting a number of available frequency-units by using the representative, based on psychoacoustic criteria where the representative exceeds a human hearing threshold;
   a first bit allocation step for determining an initial bit allocation for each of said available frequency-units by using an approximate mathematical model using said counted number of available frequency-units; and
   a second bit allocation step for determining further bit allocation for each of said available frequency-units based on psychoacoustic criteria;
   wherein said mathematical model is represented by a formula:

$$WL(u) = \frac{\operatorname{var}(u)}{F} - \frac{1}{N \cdot F} \sum_{u=0}^{N} \operatorname{var}(u) + \frac{Ba}{A \cdot N}$$

wherein
WL(u) represents number of bits allocated to the frequency-units u,
var(u) represents variance of the frequency-units u,
F represents a psychoacoustic weighting factor,
N represents the counter number of the available frequency-units,
Ba represents number of bits set aside for initial allocation, and
A represents approximate average number of spectral samples in the available frequency-units.

19. Method according to claim 18, wherein each frequency-unit is represented by a single spectral component.

20. Method according to claim 18, wherein said representative is a variance which is calculated from an amplitude of a maximum spectral component of each frequency-unit.

21. Method according to claim 18, wherein said representative is a variance which is calculated from an average of a spectral component of each frequency-unit.

\* \* \* \* \*